(12) United States Patent
Pasquero et al.

(10) Patent No.: US 8,902,170 B2
(45) Date of Patent: Dec. 2, 2014

(54) METHOD AND SYSTEM FOR RENDERING DIACRITIC CHARACTERS

(75) Inventors: Jerome Pasquero, Kitchener (CA); Donald Somerset McKenzie, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 149 days.

(21) Appl. No.: 13/485,468

(22) Filed: May 31, 2012

(65) Prior Publication Data

US 2013/0321280 A1 Dec. 5, 2013

(51) Int. Cl.
*G06F 3/048* (2013.01)

(52) U.S. Cl.
USPC .......................................... 345/169; 345/173

(58) Field of Classification Search
CPC .................. G06F 3/023–3/027; G06F 3/0481; G06F 3/0482; G06F 3/0488–3/04897
USPC ......... 345/156, 168, 169, 171–173, 467–469; 715/810–816, 864
See application file for complete search history.

(56) References Cited

U.S. PATENT DOCUMENTS

| | | | |
|---|---|---|---|
| 5,535,119 A | 7/1996 | Ito | |
| 5,623,682 A | 4/1997 | Fukunaga | |
| 6,102,594 A * | 8/2000 | Strøm | 400/486 |
| 6,445,934 B1 | 9/2002 | Khazaka | |
| 7,614,008 B2 | 11/2009 | Ording | |
| 7,802,184 B1 | 9/2010 | Battilana | |
| 8,035,534 B2 | 10/2011 | Scott | |
| 2004/0140956 A1 * | 7/2004 | Kushler et al. | 345/168 |
| 2006/0131031 A1 | 6/2006 | McKeachnie et al. | |
| 2008/0189606 A1 | 8/2008 | Rybak | |
| 2009/0058823 A1 | 3/2009 | Kocienda | |
| 2009/0104943 A1 | 4/2009 | Park et al. | |
| 2009/0167693 A1 | 7/2009 | Kuo et al. | |
| 2010/0180235 A1 | 7/2010 | Griffin et al. | |
| 2010/0328112 A1 | 12/2010 | Liu | |
| 2011/0163973 A1 | 7/2011 | Ording et al. | |

FOREIGN PATENT DOCUMENTS

| | | |
|---|---|---|
| EP | 0957425 A1 | 11/1999 |
| EP | 1921532 A1 | 5/2008 |
| EP | 2175355 A1 | 4/2010 |
| EP | 2410405 A2 | 1/2012 |

OTHER PUBLICATIONS

Communication from the European Patent Office pursuant to Article 94(3) EPC for European Application No. 12170344.1-1507, dated Oct. 4, 2013, 6 pages.
Communication form the European Patent Office enclosing the Extended European Search Report for European Application No. 12170344.1-1527, dated Oct. 2, 2012 (8 pages).
Office Action issued by Canadian Patent Office in Canadian Application No. 2817502, Jul. 31, 2014 (3 pages).

* cited by examiner

*Primary Examiner* — Nathan Danielsen
(74) *Attorney, Agent, or Firm* — Finnegan, Henderson, Farabow, Garrett & Dunner LLP

(57) ABSTRACT

A method and system for enabling input of diacritic characters on a handheld electronic device. The method includes detecting an input associated with a selected key and determining a likelihood that the input reflects selection of a diacritic character. The time after which the set of possible diacritic characters that are utilized is rendered in response to a selected key being engaged in a press-and-hold operation is based on the determined likelihood.

21 Claims, 4 Drawing Sheets

METHOD AND SYSTEM FOR RENDERING DIACRITIC CHARACTERS

BACKGROUND

The present disclosure relates generally to portable electronic devices including touch screen display devices and a method of enabling input comprising diacritic characters on a handheld electronic device.

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Portable electronic devices such as PDAs or smart telephones are generally intended for handheld use and ease of portability. Smaller devices are generally desirable for portability. A touch screen display or a keyboard for input and output is particularly useful on such handheld devices as such handheld devices are small and are therefore limited in space available for user input and output devices. Further, the screen content such as the plurality of operations associated with a particular key on the touch screen display devices are modified depending on the functions and operations being performed. However, these devices are limited in efficiently rendering content for user interaction, for example, displaying the plurality of diacritic characters that are associated with a particular key.

Improvements in a more efficient display of characters are therefore desirable.

SUMMARY

In accordance with one aspect of this description, there is provided a method of enabling input on a handheld electronic device comprising: detecting an input associated with a selected key; determining a likelihood that the input reflects selection of a diacritic character from a set of one or more diacritic characters associated with the selected key; rendering the set of the one or more diacritic characters when the likelihood meets or exceeds a threshold value following expiration of a first period of time that the selected key is engaged in a press-and-hold operation; and rendering the set of the one or more diacritic characters when the likelihood is below the threshold value following expiration of a second period of time longer than the first period of time that the selected key is engaged in a press-and-hold operation.

In accordance with another aspect of this description, there is provided a handheld electronic device comprising: an input apparatus having a number of input members that are capable of being actuated; a processor; a memory in electronic communication with the processor, the memory storing one or more routines executable by the processor, the one or more routines being adapted to: detect an input associated with a selected key; determine a likelihood that the input reflects selection of a diacritic character from a set of one or more diacritic characters associated with the selected key; render a set of the one or more diacritic characters when the likelihood meets or exceeds a threshold value following expiration of a first period of time that the selected key is engaged in a press-and-hold operation; and render the set of the one or more diacritic characters when the likelihood is below the threshold value following expiration of a second period of time longer than the first period of time, that the selected key is engaged in a press-and-hold operation.

In accordance with another aspect of this description, there is provided a computer readable storage medium storing one or more programs, the one or more programs comprising instructions, when executed by a computing device, cause the device to: detect an input associated with a selected key; determine a likelihood that the input reflects selection of a diacritic character from a set of one or more diacritic characters associated with the selected key; render a set of the one or more diacritic characters when the likelihood meets or exceeds a threshold value following expiration of a first period of time that the selected key is engaged in a press-and-hold operation; and render the set of the one or more diacritic characters when the likelihood is below the threshold value following expiration of a second period of time longer than the first period of time, that the selected key is engaged in a press-and-hold operation.

It is to be understood that both the foregoing general description and the following detailed description are exemplary and explanatory only and are not restrictive of the invention, as claimed.

BRIEF DESCRIPTION OF THE DRAWINGS

Embodiments of the present disclosure will now be described, by way of example only, with reference to the attached figures, wherein.

I. DETAILED DESCRIPTION

Figure 1:
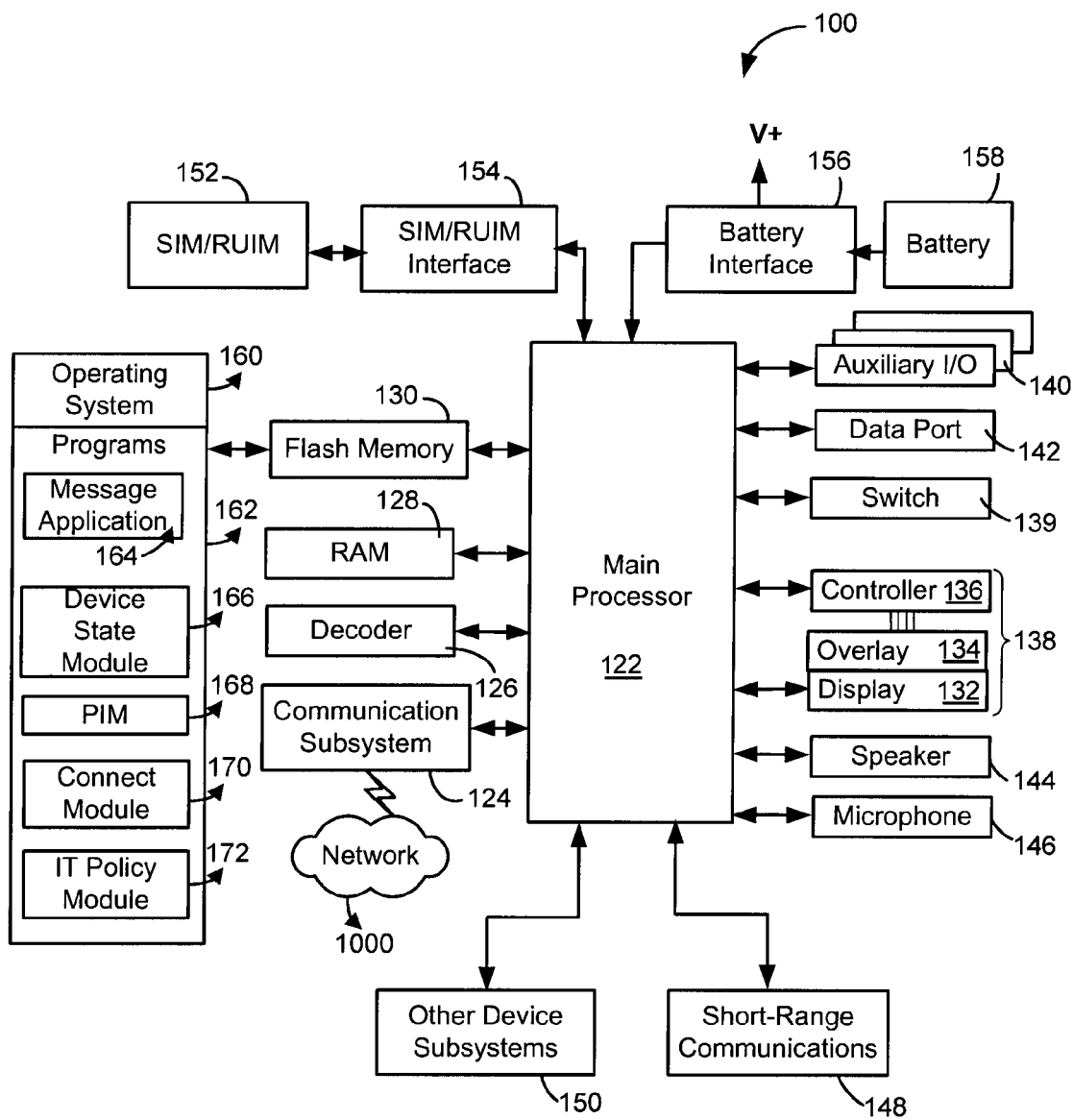
FIG. 1 is a block diagram of a portable electronic device according to one example.

It will be appreciated that for simplicity and clarity of illustration, where considered appropriate, reference numerals are repeated among the figures to indicate corresponding or analogous elements. In addition, numerous specific details are set forth in order to provide a thorough understanding of the embodiments described herein. However, it will be understood by those of ordinary skill in the art that the embodiments described herein are practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a portable electronic device including a touch screen display and controlling an appearance speed of diacritic characters in the portable electronic device. Specifically, the device determines a likelihood that an input associated with a selected key reflects a selection of a diacritic character. If the selected key is engaged in a press-and-hold operation, the device varies the appearance speed of a set of possible diacritic characters associated with the input based on the likelihood. Accordingly, the appearance speed for a set of possible diacritic characters is faster when it is determined that it is more likely that the selected key reflects a selection of a diacritic character, and the appearance speed is comparatively slower when it is determined that it is less likely that the selected key reflects a selection of a diacritic character.

Examples of portable electronic devices include mobile, or handheld, wireless communication devices such as pagers, cellular phones, cellular smart-phones, wireless organizers, personal digital assistants, wirelessly enabled notebook computers and the like. The portable electronic device is a two-way communication device with advanced data communication capabilities including the capability to communicate with other portable electronic devices or computer systems through a network of transceiver stations. The portable electronic device can also have the capability to allow voice communication. Depending on the functionality provided by the portable electronic device, it is referred to as a data messaging device, a two-way pager, a cellular telephone with data messaging capabilities, a wireless Internet appliance, or a data communication device (with or without telephony capabilities). The portable electronic device can also be a portable device without wireless communication capabilities as a handheld electronic game device, digital photograph album, digital camera and the like.

Referring first to FIG. 1, there is shown therein a block diagram of a portable electronic device 100 according to one embodiment. The portable electronic device 100 includes a number of components such as the processor 122 that controls the overall operation of the portable electronic device 100. Communication functions, including data and voice communications, are performed through a communication subsystem 124. Data received by the portable electronic device 100 is decompressed and decrypted by a decoder 126, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 124 receives messages from and sends messages to a wireless network 1000. In this embodiment of the portable electronic device 100, the communication subsystem 124 is configured in accordance with the Global System for Mobile Communication (GSM) and General Packet Radio Services (GPRS) standards. The GSM/GPRS wireless network is used worldwide. Standards such as Enhanced Data GSM Environment (EDGE), Universal Mobile Telecommunications Service (UMTS), and Long Term Evolution (LTE) are believed to have similarities to the network behavior described herein, and it will also be understood by persons skilled in the art that the embodiments described herein are intended to use any other suitable standards that are developed in the future. The wireless link connecting the communication subsystem 124 with the wireless network 1000 represents one or more different Radio Frequency (RF) channels, operating according to defined protocols such as those specified for GSM/GPRS communications. With other network protocols, these channels are capable of supporting both circuit switched voice communications and packet switched data communications.

Although the wireless network 1000 associated with portable electronic device 100 is a GSM/GPRS wireless network in one implementation, other wireless networks can also be associated with the portable electronic device 100 in variant implementations. The different types of wireless networks that are employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA1000 networks, GSM/GPRS networks (as mentioned above), third-generation (3G) networks like EDGE and UMTS, and fourth generation (4G) networks like LTE. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The processor 122 also interacts with additional subsystems such as a Random Access Memory (RAM) 128, a flash memory 130, a display 132 with a touch-sensitive overlay 134 connected to an electronic controller 136 that together make up a touch screen display 138, a switch 139, an auxiliary input/output (I/O) subsystem 140, a data port 142, a speaker 144, a microphone 146, short-range communications 148 and other device subsystems 150. The touch-sensitive overlay 134 and the electronic controller 136 provide a touch-sensitive input device and the processor 122 interacts with the touch-sensitive overlay 134 via the electronic controller 136.

Some of the subsystems of the portable electronic device 100 perform communication-related functions, whereas other subsystems can provide "resident" or on-device functions. By way of example, the display 132 and the touch-sensitive overlay 134 are used for both communication-related functions, such as entering a text message for transmission over the network 1000, and device-resident functions such as a calculator or task set.

The portable electronic device 100 can send and receive communication signals over a wireless network 1000 after network registration or activation procedures have been completed. Network access is associated with a subscriber or user of the portable electronic device 100. To identify a subscriber according to the present embodiment, the portable electronic device 100 uses a SIM/RUIM card 152 (i.e. Subscriber Identity Module or a Removable User Identity Module) inserted into a SIM/RUIM interface 154 for communication with a network such as the network 1000. The SIM/RUIM card 152 is one type of a conventional "smart card" that is used to identify a subscriber of the portable electronic device 100 and to personalize the portable electronic device 100, among other things. In the present embodiment the portable electronic device 100 is not fully operational for communication with the wireless network 1000 without the SIM/RUIM card 152. By inserting the SIM/RUIM card 152 into the SIM/RUIM interface 154, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 152 includes a processor and memory for storing information. Once the SIM/RUIM card 152 is inserted into the SIM/RUIM interface 154, it is coupled to the processor 122. In order to identify the subscriber, the SIM/RUIM card 152 can include some user parameters such as an International Mobile Subscriber Identity (IMSI). An advantage of using the SIM/RUIM card 152 is that a subscriber is not necessarily bound by any single physical portable electronic device. The SIM/RUIM card 152 can store additional subscriber information for a portable electronic device as well, including datebook (or calendar) information and recent call information. Alternatively, user identification information can also be programmed into the flash memory 130.

The portable electronic device 100 is a battery-powered device and includes a battery interface 156 for receiving one or more rechargeable batteries 158. In at least some embodiments, the battery 158 is a smart battery with an embedded microprocessor. The battery interface 156 is coupled to a regulator (not shown), which assists the battery 158 in providing power V+ to the portable electronic device 100. Although current technology makes use of a battery, future technologies such as micro fuel cells can provide the power to the portable electronic device 100.

The portable electronic device 100 also includes an operating system 160 and software components 162 to 172 which are described in more detail below. The operating system 160 and the software components 162 to 172 that are executed by the processor 122 are typically stored in a persistent store such as the flash memory 130, which can alternatively be a read-only memory (ROM) or similar storage element (not shown). Those skilled in the art will appreciate that portions of the operating system 160 and the software components 162 to 172, such as specific device applications, or parts thereof, are temporarily loaded into a volatile store such as the RAM 128. Other software components can also be included, as is well known to those skilled in the art.

The subset of software applications 162 that control basic device operations, including data and voice communication applications, will normally be installed on the portable electronic device 100 during its manufacture. Other software applications include a message application 164 that is any suitable software program that allows a user of the portable electronic device 100 to send and receive electronic messages. Various alternatives exist for the message application 164 as is well known to those skilled in the art. Messages that have been sent or received by the user are typically stored in the flash memory 130 of the portable electronic device 100 or some other suitable storage element in the portable electronic device 100. In at least some embodiments, some of the sent and received messages are stored remotely from the device 100 such as in a data store of an associated host system with which the portable electronic device 100 communicates.

The software applications can further include a device state module 166, a Personal Information Manager (PIM) 168, and other suitable modules (not shown). The device state module 166 provides persistence, i.e. the device state module 166 ensures that important device data is stored in persistent memory, such as the flash memory 130, so that the data is not lost when the portable electronic device 100 is turned off or loses power.

The PIM 168 includes functionality for organizing and managing data items of interest to the user, such as, but not limited to, e-mail, contacts, calendar events, voice mails, appointments, and task items. A PIM application has the ability to send and receive data items via the wireless network 1000. PIM data items are seamlessly integrated, synchronized, and updated via the wireless network 1000 with the portable electronic device subscriber's corresponding data items stored and/or associated with a host computer system. This functionality creates a mirrored host computer on the portable electronic device 100 with respect to such items.

The portable electronic device 100 also includes a connect module 170, and an information technology (IT) policy module 172. The connect module 170 implements the communication protocols that are required for the portable electronic device 100 to communicate with the wireless infrastructure and any host system, such as an enterprise system, that the portable electronic device 100 is authorized to interface with.

The connect module 170 includes a set of APIs that is integrated with the portable electronic device 100 to allow the portable electronic device 100 to use any number of services associated with the enterprise system. The connect module 170 allows the portable electronic device 100 to establish an end-to-end secure, authenticated communication pipe with the host system. A subset of applications for which access is provided by the connect module 170 is used to pass IT policy commands from the host system to the portable electronic device 100. This is done in a wireless or wired manner. These instructions can then be passed to the IT policy module 172 to modify the configuration of the device 100. Alternatively, in some cases, the IT policy update can also be done over a wired connection.

Other types of software applications can also be installed on the portable electronic device 100. These software applications are third party applications, which are added after the manufacture of the portable electronic device 100. Examples of third party applications include games, calculators, utilities, etc.

The additional applications are loaded onto the portable electronic device 100 through at least one of the wireless network 1000, the auxiliary I/O subsystem 140, the data port 142, the short-range communications subsystem 148, or any other suitable device subsystem 150. This flexibility in application installation increases the functionality of the portable electronic device 100 and can provide enhanced on-device functions, communication-related functions, or both. For example, secure communication applications can enable electronic commerce functions and other such financial transactions to be performed using the portable electronic device 100.

The data port 142 enables a subscriber to set preferences through an external device or software application and extends the capabilities of the portable electronic device 100 by providing for information or software downloads to the portable electronic device 100 other than through a wireless communication network. The alternate download path can, for example, be used to load an encryption key onto the portable electronic device 100 through a direct and thus reliable and trusted connection to provide secure device communication.

The data port 142 is any suitable port that enables data communication between the portable electronic device 100 and another computing device. The data port 142 is a serial or a parallel port. In some instances, the data port 142 is a USB port that includes data lines for data transfer and a supply line that can provide a charging current to charge the battery 158 of the portable electronic device 100.

The short-range communications subsystem 148 provides for communication between the portable electronic device 100 and different systems or devices, without the use of the wireless network 1000. For example, the short-range communications subsystem 148 can include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 124 and input to the processor 122. The processor 122 then processes the received signal for output to the display 132 or alternatively to the auxiliary I/O subsystem 140. A subscriber can also compose data items, such as e-mail messages, for example, using the touch-sensitive overlay 134 on the display 132 that are part of the touch screen display 138, and possibly the auxiliary I/O subsystem 140. The auxiliary I/O subsystem 140 can include devices such as: a mouse, track ball, infrared fingerprint detector, or a roller wheel with dynamic button pressing capability. A composed item is transmitted over the wireless network 1000 through the communication subsystem 124.

For voice communications, the overall operation of the portable electronic device 100 is substantially similar, except that the received signals are output to the speaker 144, and signals for transmission are generated by the microphone 146. Alternative voice or audio I/O subsystems, such as a voice message recording subsystem, can also be implemented on the portable electronic device 100. Although voice or audio signal output is accomplished primarily through the speaker 144, the display 132 can also be used to provide additional information such as the identity of a calling party, duration of a voice call, or other voice call related information.

Figure 2:
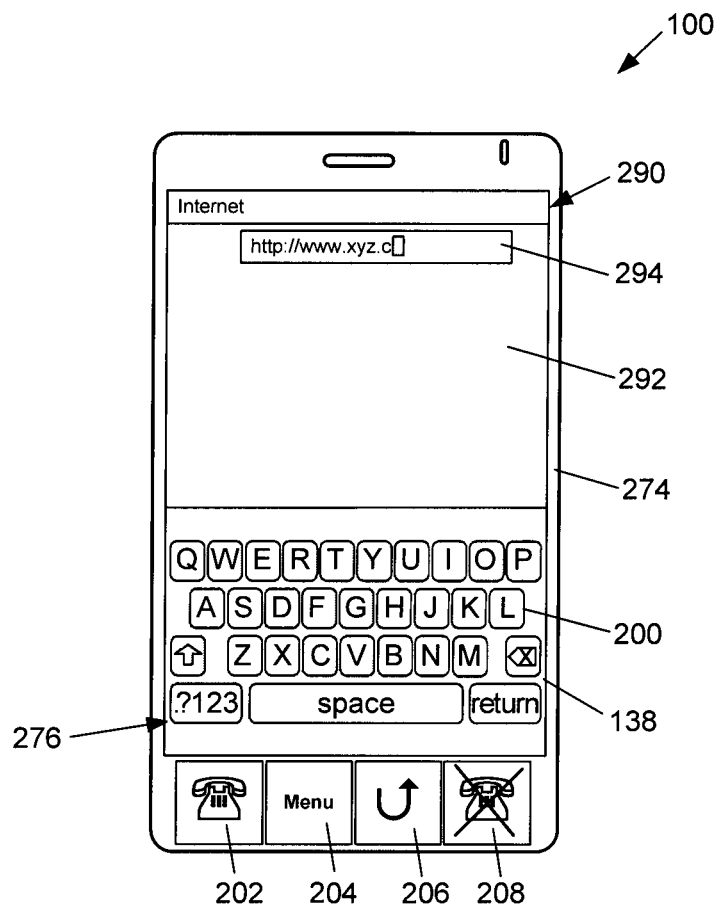
FIG. 2 is a front view of a portable electronic device shown in a portrait orientation.

Reference is now made to FIG. 2, which shows a front view of a portable electronic device 100 in portrait orientation. The portable electronic device 100 includes a housing 274 that houses the internal components that are shown in FIG. 1 and frames the touch screen display or touch-sensitive display 138 such that the touch screen display 138 is exposed for user-interaction therewith when the portable electronic device 100 is in use. In the orientation shown in FIG. 2, the touch screen display 138 includes a portrait mode virtual keyboard 276 for user entry of data in the form of, for example, text during operation of the portable electronic device 100. It will be appreciated that such a virtual keyboard is used for data entry in any suitable application such as in an electronic mail application, during electronic mail composition or in any other suitable application. The portrait mode virtual keyboard 276 of FIG. 2 is provided for data entry in an Internet browser application and is shown as a reduced keyboard for purposes. The present disclosure is not limited to the portrait mode virtual keyboard 276 shown as other keyboards including reduced keyboards or keyboards with further options are possible.

Touch screen display 138 comprises components that together enable touch operations in connection with a display. In one example embodiment, touch screen display 138 comprises a capacitive touch screen display. The capacitive touch screen display 138 includes a display device, such as an LCD display 132 and a touch-sensitive overlay 134. The capacitive touch-sensitive overlay 134 includes a number of layers in a stack fixed to the display 132 via an optically clear adhesive. The layers include, for example, a substrate fixed to the LCD display 132 by an adhesive, a ground shield layer, a barrier layer, a pair of capacitive touch sensor layers separated by a substrate or other barrier layer, and a cover layer fixed to the second capacitive touch sensor layer by a suitable adhesive. In one example embodiment, patterned indium tin oxide (ITO) is used to compose the capacitive touch sensor layers.

A touch event is detected upon user touching of the touch screen display 138. Such a touch event is determined upon a user touch at the touch screen display 138 for selection of, for example, a feature in a set, such as a message or other feature for scrolling in the set or selecting a virtual input key. Signals are sent from the touch-sensitive overlay 134 to the controller 136 when a suitable object such as a finger or other conductive object held in the bare hand of a user, is detected. Thus, the touch event is detected and the X and Y location of the touch are determined. The X and Y location of the touch are determined to fall within the touch-sensitive area defined by the boundary on the touch screen display 138.

In the present example, the X and Y location of a touch event are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 136 as a result of capacitive coupling with a suitable object such as a finger of a user or a conductive object held in a bare hand of a user resulting in a change in the electric field of each of the touch sensor layers. The signals represent the respective X and Y touch location values. It will be appreciated that other attributes of the user's touch on the touch screen display 138 is determined. For example, the size and the shape of the touch on the touch screen display 138 is determined in addition to the location (X and Y values) based on the signals received at the controller 136 from the touch sensor layers. A press-and-hold operation is engaged when pressure is applied so that a switch (not illustrated) within the electronic device 100 is actuated and the pressure to depress the touch screen display 138 is maintained.

Referring still to FIG. 2, it will be appreciated that a user's touch on the touch screen display 138 is determined by determining the X and Y touch location and user-selected input is determined based on the X and Y touch location and the application executed by the processor 122. In the screen shown in the front view of FIG. 2, the application provides the virtual keyboard 276 having a plurality of virtual input keys or buttons, which is selected by the user. The user selected virtual input key is matched to the X and Y touch location. Thus, the button selected by the user is determined based on the X and Y touch location and the application. In the example shown in FIG. 2, the user enters text via the virtual keyboard 276, selecting characters associated with the virtual input keys, such as letters from the virtual keyboard 276 by touching the touch screen display at the location of the letters, corresponding to the virtual input keys, of the virtual keyboard 276. In embodiments of the portable electronic device 100, the text or data entry is accomplished by a "click to enter" operation. Once the user has selected a character, the character is entered by depressing the virtual input key on the touch screen display 138 with sufficient force to overcome the bias of the touch screen display 138 and the actuation force of the switch 139, to cause movement of the touch screen display 138 and actuation of the switch 139. The selection of the virtual input key 200 (based on the X and Y location on the touch screen display) and the actuation of the switch 139 results in signals that are received by the processor 122, thereby entering the corresponding character for rendering on the touch screen display.

According to the present example as illustrated in FIG. 2, the processor 122 receives a user-selection of an Internet browser application for browsing the Internet by, for example, determination of a touch event at an Internet browser icon (not shown) displayed on the touch screen display 138.

For illustrative purposes, the virtual keyboard is rendered in the portrait mode as shown in FIG. 2. Devices, such as accelerometers, are used to determine the relative orientation of the portable electronic device 100 and change the orientation of the touch screen display accordingly. In the present example, the portrait mode virtual keyboard 276 is a full keyboard. The virtual input keys or buttons 200 are rendered characters and other keyboard buttons displayed in an upright position for the user. The keyboard can also be a reduced QWERTY keyboard. The portable electronic device 100 according to the present example also includes four physical buttons 202, 204, 206, 208 in the housing 274 for user-selection for performing functions or operations including an "off-hook" button 202 for placing an outgoing cellular telephone call or receiving an incoming cellular telephone call, a Menu button 204 for displaying a context-sensitive menu or submenu, an escape button 206 for returning to a previous screen or exiting an application, and an "on-hook" button for ending a cellular telephone call. The remainder of the buttons shown on the face of the portable electronic device of FIG. 2 are virtual buttons or input keys 200 on the touch screen display 138.

Along with the virtual keyboard, a display area is rendered, which in the present example is a portrait mode display area 290 that is a portrait mode Internet browser display screen 292. The display area is provided in the portrait mode as a result of determination of the orientation at the accelerometer (not shown). The display area is rendered above the portrait mode virtual keyboard 276 when the portable electronic device 100 is in the portrait orientation.

As a result of a user touching any of the virtual buttons of the virtual keyboard and actuation of the switch (not illustrated), data input received from the virtual keyboard is rendered in a data entry field 294 of the Internet browser display screen 292. As shown, input is received in the form of user selection of characters including letters and symbols by touching ones of the virtual buttons 200 in the portrait mode virtual keyboard 276 and entry by actuation of the switch 139. In the example shown in FIG. 2, the user enters "http://www.xyz.c" and the data received is displayed in the data entry field 294 of the portrait mode Internet browser display screen 292.

When entering data, the user can turn the portable electronic device 100 to a landscape orientation. A user can choose to turn the portable electronic device 100 to a different orientation to provide a different keyboard such as to change from a full keyboard to a keyboard with additional options. In another example, the user can also choose to turn the portable electronic device 100 to provide a different display area for the application.

Apart from regular characters, it is desirable to input special or secondary characters such as diacritic characters during data or text entry for applications such as email, messaging (SMS, MMS, etc.), notepad, and scheduler among others, on the portable electronic device 100. Given the typically small size of the portable electronic device 100, and, therefore, the limited space available for user input and output devices, it is not practical to assign a dedicated virtual input key for each diacritic character. Although, the screen content on the touch screen display device is modified depending on the functions and operations being performed, it is desirable to have a convenient, intuitive, and user-friendly way to enter diacritic characters and the like without having to constantly change or refresh the screen content on the touch screen display.

Figure 3:
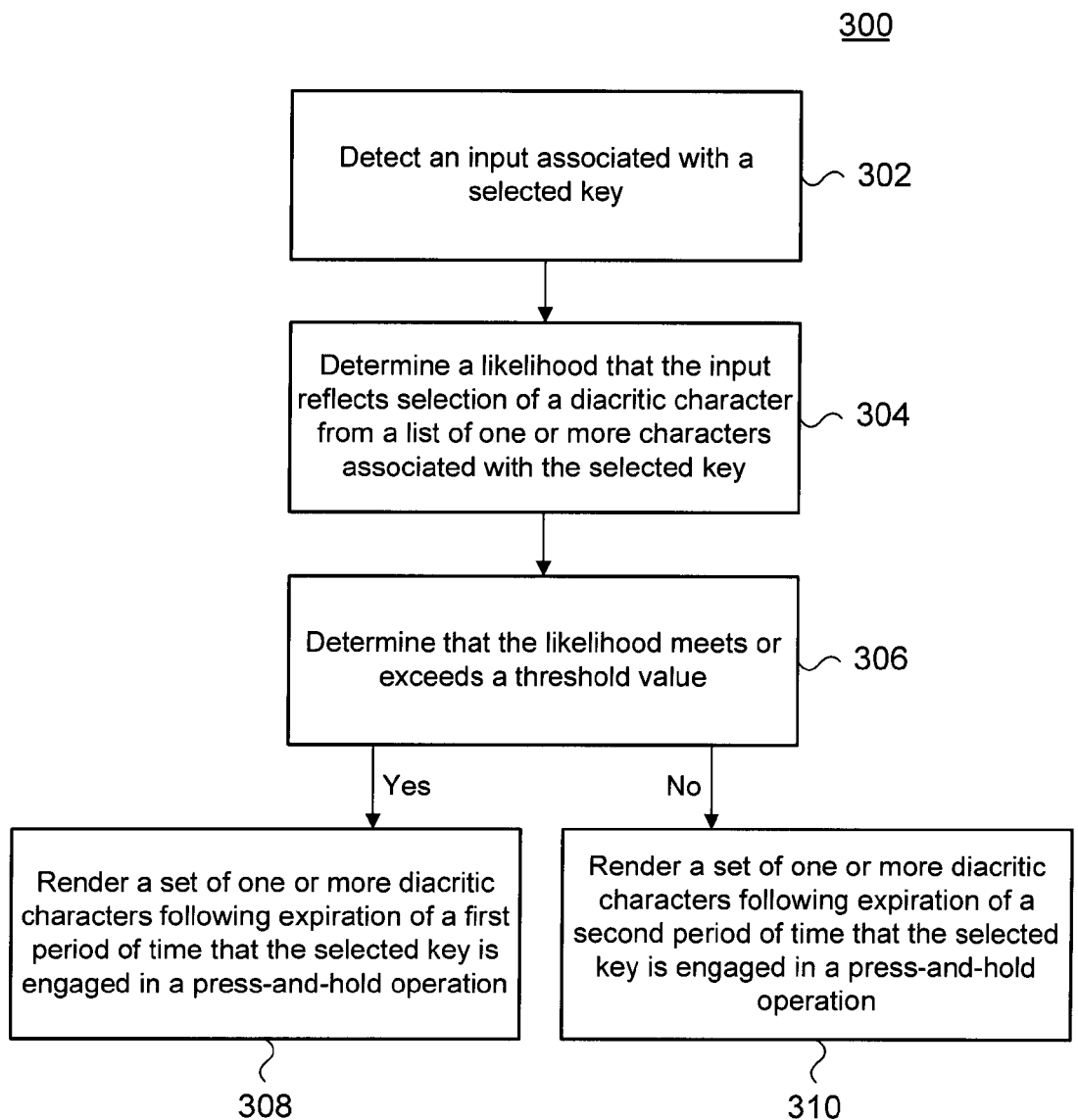
FIG. 3 is a flow chart showing a method enabling input in an electronic device according to an embodiment.

FIG. 3 is a flow diagram 300 of an example method of operation, according to an embodiment for enabling input on a handheld electronic device that has a touch screen display. Referring to FIG. 3, the method includes detecting an input associated with a selected key at step 302. For example, an input is detected when a key 200 is actuated by a user's touch and based on the X and Y coordinates of the touch.

At step 304, upon detection of an input associated with a selected key, a likelihood is determined that the input reflects selection of a diacritic character from a set of one or more diacritic characters associated with the selected key.

The likelihood is determined using a word prediction algorithm that involves, among other things, using a current string of characters being entered, context such as the words that come before the current string being entered, or the running application which is utilizing the word prediction that takes place. As an example of a word prediction algorithm, an application SwiftKey™ can be utilized. For example, a probabilistic function may indicate that the word "touché" often comes after the phrase "he said:". In another embodiment the algorithm involves calculating a probability that one or more of the diacritic characters associated with a particular key is the diacritic character that a user wishes to select. Accordingly, in an instance, a probability is calculated taking into account all of the associated diacritic characters, while in other instances, the determined likelihood takes into account less than all of the associated diacritic characters. For example, an algorithm calculates a likelihood based on previous usage. A user typing in French, in previous usage utilizes two out of four diacritic characters associated with selection of a key "e", sixty percent of the time after typing in a word beginning with "appr". In French, the letter "e" can have four possible diacritics: ê, é, ë and è. In this example, two of the diacritic characters related to the key "e" are "ê" and "é" which are used for "appréhender" and "apprêter". Forty percent of the time, there is no usage of a diacritic character. Therefore, the remaining two out of four ("ë" and "è") diacritic characters are never utilized in previous usage. Accordingly, a probability is assigned to the usage of the two utilized diacritic characters based on a sixty percent usage rate. While the remaining two associated diacritic characters which are previously never used are assigned a low or zero value for calculation of the probability.

In one embodiment, before step 304, which determines the likelihood whether the input reflects selection of a diacritic character, a language for the input is first determined. Determining the language aids in determining the likelihood that an input can utilize a diacritic character. For example, in English, a word "experience" is spelt without any diacritic characters. However, in French, "expérience" utilizes a diacritic character "é". Therefore, when the "e" key is engaged in a press-and-hold operation, the list of diacritic characters for the letter "e" would appear much faster after the user has typed "exp" than after "expéri", as explained in further details below with respect to steps 306-310. A word prediction algorithm or application such as SwiftKey™ detects the language. In another embodiment, the language is detected based on a selection of a predetermined language by a user of the handheld electronic device, by analyzing a metadata of a message previously received by the handheld electronic device, by analyzing heuristically a message previously received by the handheld electronic device, or a combination thereof.

In another embodiment, where a language of the input is determined before the step of determining the likelihood, the calculation of the likelihood value takes into account the determined language, utilizes a dictionary stored by said handheld electronic device that corresponds to the language, or includes utilizing a language rule set that corresponds to the language. For example, the calculation of the likelihood does not take into account diacritic characters associated with a selected key in non-determined languages or reduces the likelihood of the diacritic characters in the non-determined languages. That is, if the input language is French, the likelihood does not take into account or reduces the likelihood of diacritic characters associated with a selected key in Spanish.

Figure 4:
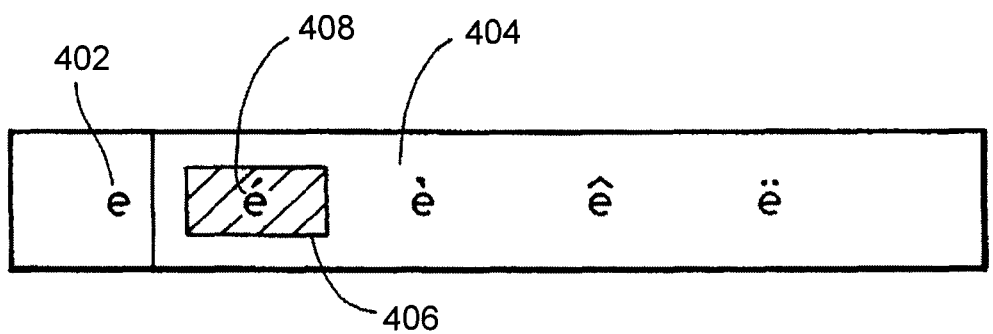
FIG. 4 illustrates a rendered set of diacritic characters associated with a key according to an embodiment.

At step 306, the method includes determining that the likelihood meets or exceeds a threshold value. If the likelihood does meet or exceed the threshold value, a set of one or more diacritic characters is rendered following expiration of a first period of time that the selected key is engaged in a press-and-hold operation, at step 308. However, if the likelihood does not meet or exceed the threshold value, and is therefore below the threshold value, the set of one or more diacritic characters is rendered following expiration of a second period of time that is longer than the first period of time, that the selected key is engaged in a press-and-hold operation, at step 310. For example, a set 400 is displayed in FIG. 4. A key 200 corresponding to the letter "e" is selected based on an input by a touch event. If the key 200 corresponding to the letter "e" is engaged in a press-and-hold operation, proposed diacritic characters are displayed in a set of one or more diacritic characters 404. In this example, a cursor 406 can be utilized to select a first diacritic character 408.

The first period of time is shorter than the second period of time. Accordingly, if the likelihood meets or exceeds the threshold value when the selected key 200 is engaged in a press-and-hold operation, the appearance speed of the set 400 would be faster than when the likelihood is below the threshold value. The threshold value is user selected, pre-defined, or a function of an algorithm. The first period of time is less than 0.5 seconds while the second period is more than 0.95 seconds. While the respective periods of time are varied, the periods of time are of different lengths allowing for a more efficient display of diacritic characters based on their appearance speed.

In one embodiment, the first and second time periods are chosen based on one of a user selection, a learning algorithm, or another configuration method. The learning algorithm is based upon user behavior, prior usage and selection of diacritic characters, or other relevant characteristics linked with the usage of a diacritic character. For example, the system determines that a user enters inputs into a keyboard at a relatively fast rate and a third of a second is a large period of time for the user to be engaged in a press-and-hold operation. Accordingly, the first and second periods of time are adjusted to be shorter to reflect a user's typing speed. Alternatively, if the user is a slow typist, the periods of time are adjusted to be longer to accommodate the user behavior.

In another embodiment, all of the diacritic characters associated with a key 200 are not displayed but only a certain number of the diacritic characters are displayed. The selected diacritic characters to be displayed in the set 400 are pre-defined, user selected, based on space available on a display screen, or based on the likelihood of their usage. Furthermore, the diacritic characters chosen to be displayed from all of the diacritic characters associated with a key 200 can be based on the individual likelihood of the usage of each diacritic character, pre-defined settings, user settings, a learning algorithm, or any other configuration methods.

Embodiments are represented as a software product stored in a machine-readable medium (also referred to as a computer-readable medium, a processor-readable medium, or a computer usable medium having a computer readable program code embodied therein). The machine-readable medium is any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment. Those of ordinary skill in the art will appreciate that other instructions and operations necessary to implement the described embodiments can also be stored on the machine-readable medium. Software running from the machine-readable medium can interface with circuitry to perform the described tasks.

While the embodiments described herein are directed to particular implementations of the portable electronic device and the method of controlling the portable electronic device, it will be understood that modifications and variations can occur to those skilled in the art. All such modifications and variations are believed to be within the sphere and scope of the present disclosure.

What is claimed is:

1. A method of enabling input on a handheld electronic device comprising:
   detecting an input associated with a selected key;
   determining a likelihood that the input reflects selection of a diacritic character from a set of one or more diacritic characters associated with the selected key;
   rendering the set of the one or more diacritic characters when the likelihood meets or exceeds a threshold value following expiration of a first period of time that the selected key is engaged in a press-and-hold operation; and
   rendering the set of the one or more diacritic characters when the likelihood is below the threshold value following expiration of a second period of time longer than the first period of time, that the selected key is engaged in a press-and-hold operation.

2. The method of claim 1, wherein the second period of time is a function of the determined likelihood.

3. The method of claim 1, wherein the likelihood is determined based on a probability calculation utilizing all of possible diacritic characters that are associated with the selected key.

4. The method of claim 1, wherein the first period of time is less than half the second period of time.

5. The method of claim 1, further comprising detecting a language for the input prior to the step of determining the likelihood whether the input reflects selection of the diacritic character.

6. The method of claim 5, wherein the step of determining the likelihood that the input reflects selection of the diacritic character is one of; based on the language, includes utilizing a dictionary stored by the handheld electronic device that corresponds to the language, or includes utilizing a language rule set handheld electronic device that corresponds to the language.

7. The method of claim 5, wherein the step of detecting the language comprises one of; detecting a selection of a predetermined language by a user of the handheld electronic device, analyzing a metadata of a message previously received by the handheld electronic device, or analyzing heuristically a message previously received by the handheld electronic device.

8. A handheld electronic device comprising:
   one or more input members that are capable of being actuated;
   a processor;
   a memory in electronic communication with the processor, the memory storing one or more routines executable by the processor, the one or more routines being adapted to:
   detect an input associated with a selected key;
   determine a likelihood that the input reflects selection of a diacritic character from a set of one or more diacritic characters associated with the selected key;
   render a set of the one or more diacritic characters when the likelihood meets or exceeds a threshold value following expiration of a first period of time that the selected key is engaged in a press-and-hold operation; and
   render the set of the one or more diacritic characters when the likelihood is below the threshold value following expiration of a second period of time longer than the first period of time, that the selected key is engaged in a press-and-hold operation.

9. The handheld device of claim 8, wherein the second period of time is a function of the determined likelihood.

10. The handheld device of claim 8, wherein the likelihood is determined based on a probability calculation that utilizes all of possible diacritic characters that are associated with the selected key.

11. The handheld device of claim 8, wherein the first period of time is less than half the second period of time.

12. The handheld device of claim 8, wherein the one or more routines are further adapted to detect a language for the input prior to the step of determining the likelihood whether the input reflects selection of a diacritic character.

13. The handheld device of claim 12, wherein the determination of the likelihood that the inputs reflects selection of a diacritic character is on one of; based on the language, utilizes a dictionary stored by said handheld electronic device that corresponds to the language, or utilizes a language rule set handheld electronic device that corresponds to the language.

14. The handheld device of claim 12, wherein the language detection comprises one of; detect a selection of a predetermined language by a user of the handheld electronic device, analyze a metadata of a message previously received by the handheld electronic device, or analyze heuristically a message previously received by the handheld electronic device.

15. A non-transitory computer readable storage medium storing one or more programs, the one or more programs comprising instructions, when executed by a computing device, cause the device to:
   detect an input associated with a selected key;
   determine a likelihood that the input reflects selection of a diacritic character from a set of one or more diacritic characters associated with the selected key;
   render a set of the one or more diacritic characters when the likelihood meets or exceeds a threshold value following expiration of a first period of time that the selected key is engaged in a press-and-hold operation; and
   render the set of the one or more diacritic characters when the likelihood is below the threshold value following expiration of a second period of time longer than the first period of time, that the selected key is engaged in a press-and-hold operation.

16. The non-transitory computer readable storage medium of claim 15, wherein the second period of time is a function of the determined likelihood.

17. The non-transitory computer readable storage medium of claim 15, wherein the likelihood is determined based on a probability calculation that utilizes all of possible diacritic characters that are associated with the selected key.

18. The non-transitory computer readable storage medium of claim 15, wherein the first period of time is less than half the second period of time.

19. The non-transitory computer readable storage medium of claim 15, wherein the one or more routines are further adapted to detect a language for the input prior to the step of determining the likelihood whether the input reflects selection of a diacritic character.

20. The non-transitory computer readable storage medium of claim 19, wherein the determination of the likelihood that the input reflects selection of the diacritic character is one of; based on the language, utilizes a dictionary stored by said handheld electronic device that corresponds to the language, or utilizes a language rule set handheld electronic device that corresponds to the language.

21. The non-transitory computer readable storage medium of claim 19, wherein the language detection comprises one of; detect a selection of a predetermined language by a user of the handheld electronic device, analyze a metadata of a message previously received by the handheld electronic device, or analyze heuristically a message previously received by the handheld electronic device.

* * * * *